United States Patent [19]

Gierer

[11] Patent Number: 4,944,202
[45] Date of Patent: Jul. 31, 1990

[54] ELECTROHYDRAULIC CONTROL FOR AN AUTOMATICALLY SHIFTABLE AUTOMOTIVE TRANSMISSION

[75] Inventor: Georg Gierer, Kressbronn, Fed. Rep. of Germany

[73] Assignee: Zahnradfabrik Friedrichshafen AG, Friedrichshafen, Fed. Rep. of Germany

[21] Appl. No.: 328,581
[22] PCT Filed: Sep. 7, 1987
[86] PCT No.: PCT/EP87/00505
§ 371 Date: Feb. 24, 1989
§ 102(e) Date: Feb. 24, 1989
[87] PCT Pub. No.: WO88/02078
PCT Pub. Date: Mar. 24, 1988

[30] Foreign Application Priority Data
Sep. 9, 1986 [WO] PCT Int'l Appl. ............ PCT/EP86/00517

[51] Int. Cl.$^5$ .................... B60K 41/06
[52] U.S. Cl. .................... 74/869; 475/129
[58] Field of Search .......... 74/752 A, 867, 868, 74/869

[56] References Cited
U.S. PATENT DOCUMENTS

| | | |
|---|---|---|
| 3,559,669 | 2/1971 | Dach ........................ 137/102 |
| 4,674,364 | 6/1987 | Shindo et al. ........... 74/752 A X |
| 4,718,310 | 1/1988 | Shindo et al. ........... 74/752 A X |
| 4,727,772 | 3/1988 | Samiya et al. .......... 74/752 A X |
| 4,811,630 | 3/1989 | Heber ...................... 74/752 A |

FOREIGN PATENT DOCUMENTS

| | | |
|---|---|---|
| 2264944 | 9/1975 | Fed. Rep. of Germany. |
| 2659353 | 4/1978 | Fed. Rep. of Germany. |
| 8706670 | 11/1987 | World Int. Prop. O. ........ 74/752 A |

OTHER PUBLICATIONS
Automobiltechnische Zeischrift, vol. 85, No. 6, pp. 401–405; Jun. 1983.

Primary Examiner—Dwight Diehl
Attorney, Agent, or Firm—Herbert Dubno

[57] ABSTRACT

An electrohydraulic control for an automatically shiftable transmission (G 1) has at least two solenoid valves (1a, 1b) which are connected via the control pressure lines (13, 14) with gear control valves (2, 3) and these with coupling valves (4, 5) and shock absorbers (6, 7) via system pressure lines (260, 261, 262) for the engagement of the couplings (C, C'). In order to shift into a gear, two couplings are engaged and the coupling valves have an additional connection for the supply of a load-dependent modulation pressure. Via a control pressure line (14), system pressure lines (330, 331, 332 and 530, 531) as well as a modulation pressure line (17), a gear-control valve (3) and a coupling valve (5) with a shock absorber (6) are connected in such a manner that one of the couplings (C') is closed with a delay. Due to this delay, a smoother shifting results, particularly when shifting with a zero load or in the lower load range.

6 Claims, 2 Drawing Sheets

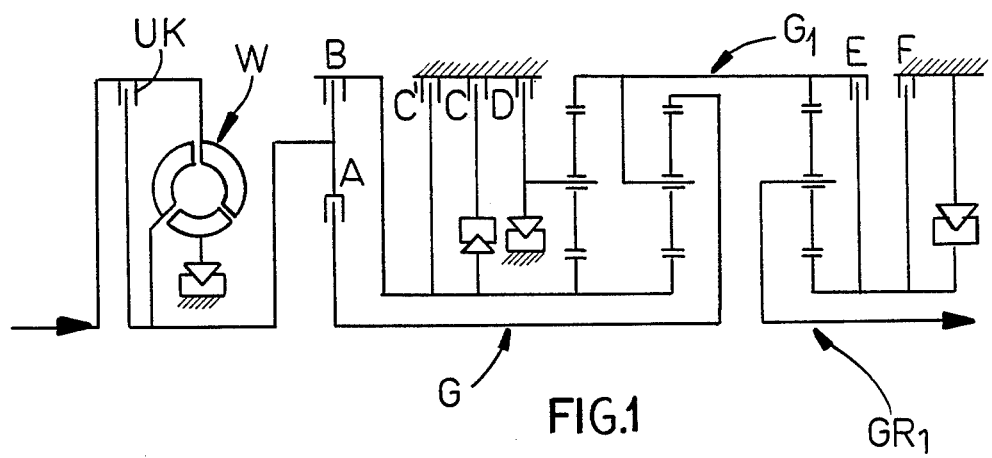
FIG.1
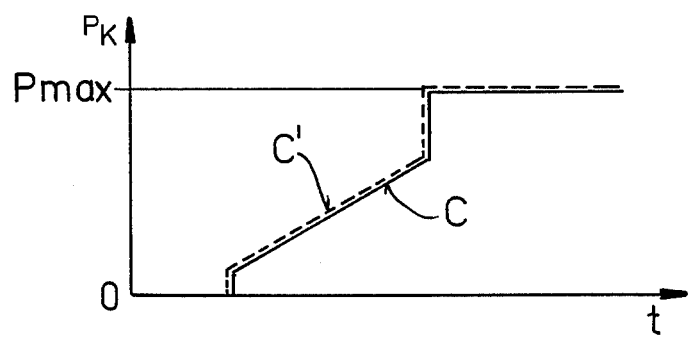
FIG.2
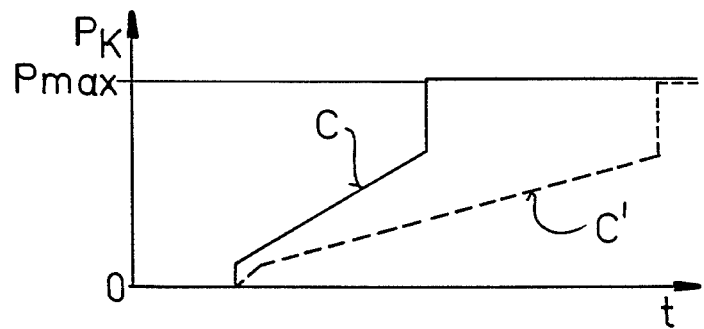
FIG.4
FIG.5

ELECTROHYDRAULIC CONTROL FOR AN AUTOMATICALLY SHIFTABLE AUTOMOTIVE TRANSMISSION

CROSS REFERENCE TO RELATED APPLICATIONS

This application is a National Phase application of PCT/EP87/00505 filed 7 Sept. 1987 and based upon Luxembourg application PCT/EP86/00517 of 9 Sept. 1986.

This invention relates to an electrohydraulic control for an automatically shiftable automotive transmission with at least two solenoid valves which are connected via control pressure lines with gear control valves, and these are connected with clutch valves and shock absorbers via system pressure lines in order to engage the clutches and wherein in order to shift into a gear the two clutches are engaged, whereby the clutch valves have an additional connection for the supply of a load-dependent modulation pressure.

FIELD OF THE INVENTION

A 4-speed automatic transmission with electronic-hydraulic control is known from two publications in ATZ 85 (1983) 6 pages 393 to 405. From FIG. 6 page 403 it is known that for instance second gear is engaged via two solenoid valves (MV 1, MV 2) and two gear control valves 1–2, 2–3, as well as two clutch valves C, C' and the thereto pertaining clutches C, C'. In the publication 4 HP 22 E of the ZF GETRIBE GMBH SAARBRÜCKEN, Oil Circuit Diagrams, this electronic-hydraulic control is illustrated in detail and completed in FIG. 6. The gear-control- and clutch valves and their connection lines, as well as the dampers for the clutches C and C' are discernable.

Since particularly in a gear shift from the first to the second gear the highest rotational speed difference normally nust be compensated and the layout of the clutches has to be done in view of this possible difference and full load, rough gear changes occur frequently at zero- or partial loads.

OBJECT OF THE INVENTION

It is therefore the object of the invention to improve an electrohydraulic control as describe so that in the case of gear changes with high rotational-speed differences with a zero load or in the lower load range no rough transitions result at minimum expense.

SUMMARY OF THE INVENTION

This object is attained in that, for the closing of the clutches, the control pressure line, the system pressure line and the modulation pressure line connect a gear-control valve and a clutch valve with a damper and cooperate therewith in such a way that one clutch is closed with a delay.

While according to the state of the art both couplings are simultaneously engaged over the entire load range, it is possible to delay the closing of one coupling with simple means, so that a smoother load takeover, and thereby a smoother gear change, results. The additional engagement of the second clutch, delayed with respect to the engagement of the first clutch occurs depending on the load. Preferably the delayed engagement of the second clutch takes place at a lower load and thereby at a lower rotational speed difference. With this arrangement the invention is further developed in an advantageous manner. Since in an automatic transmission, in addition to a good gear-change quality, the time required for a gear shift and also the wear of the couplings in the friction phase are of greatest importance, the synchronous or asynchronous engagement of the coplings depending on the load range is particularly advantageous, because the asynchronous engagement occurs only under partial- or zero load, when it is necessary for a quality gear shift.

From DE-B-26 59 353 a hydraulic control system is known wherein when shifting up for changing to a gear with high rotational speed difference (e.g. gear 1 to gear 2) the layout of the coupling for the full load takes place and independently from the actual load during the shifting-up operation and the timely delayed pressure build-up, two couplings (brakes C, C') are symmetrically filled with pressure medium. Only after the slip phase has been concluded, the coupling pressure from the first coupling (brake C) switches the coupling valve of the second coupling (brake C'), so that now the pressure build-up of this second coupling C' is slowed down in comparison to the first coupling, by means of a throttled supply line. This now different pressure build-up, however, has no influence on the quality of the shifting transition in a shifting up 1–2. The throttled line at the coupling valve is provided only so that during a shifting down from speed 3 to speed 2, which is performed by filling the coupling (brake C'), this occurs without knocks.

With this system rough shifting-up operations can not be prevented with low load or reduced rotational speed differences.

BRIEF DESCRIPTION OF THE DRAWING

The above and other objects, features and advantages of my invention will become more readily apparent from the following description, reference being made to the accompanying highly diagrammatic drawing in which:

FIG. 1 is a four-speed automatic transmission in schematic representation;

FIG. 2 is a table showing the couplings, brakes and solenoid valves engaged in the individual speeds;

FIG. 4 is illustration of the synchronous couplings engagement in a pressure-time and;

FIG. 5 is illustration of the asynchronous couplings engagement in a pressure-time diagram.

SPECIFIC DESCRIPTION

Figure 3:
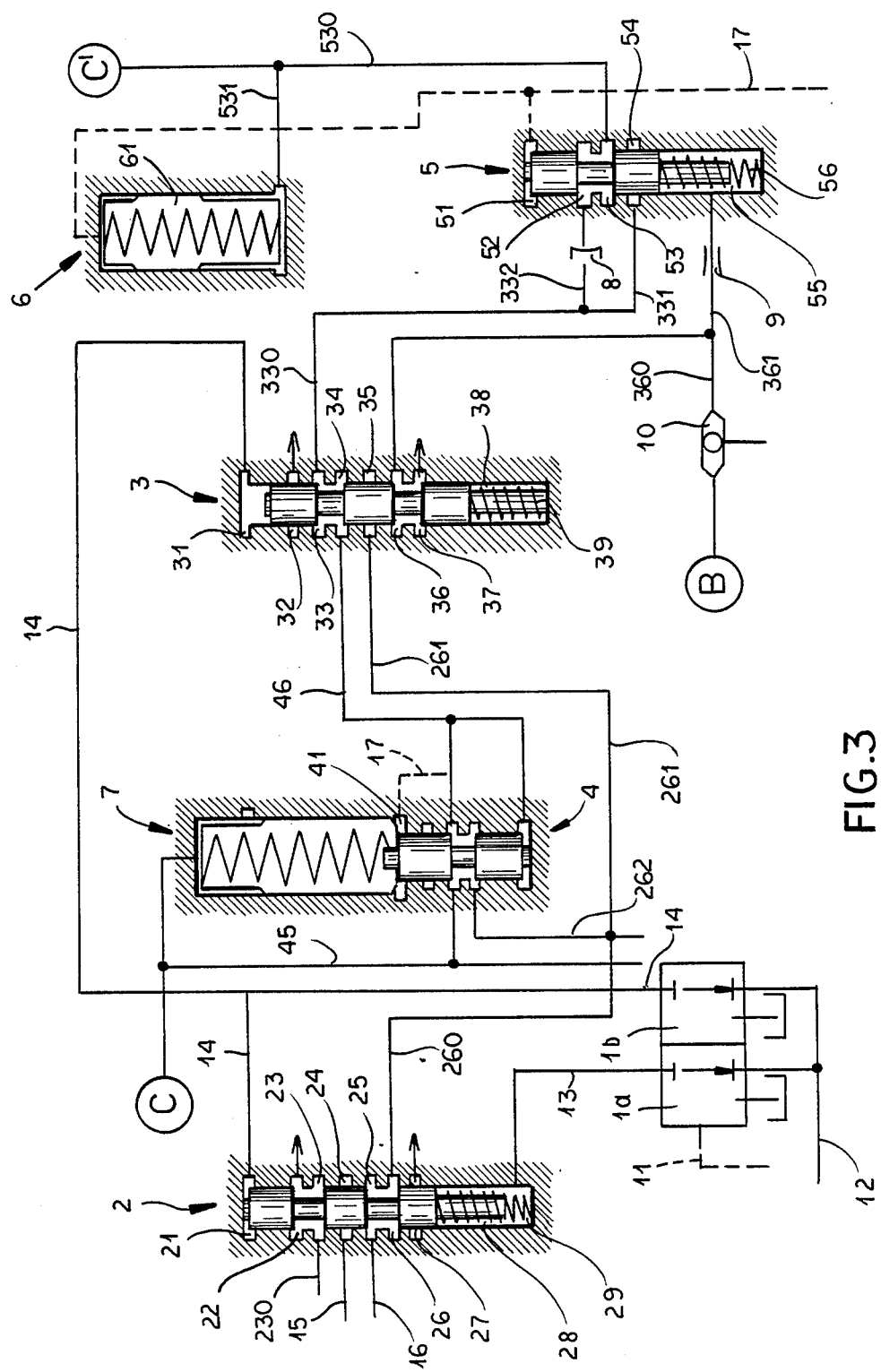
FIG. 3 is a simplified control- and oil-circuit diagram in the range of the couplings for the second speed.

The automatic transmission G 1 according to FIG. 1 is driven by verter W with a bypass clutch UK and consists of a basic transmission G with clutches A and B, as well as clutches (brakes) C', C and D and of an auxiliary transmission for the fourth speed with clutch E and the clutch (brake) F. Further, for the improvement of the gear changes and the control, unmarked freewheeling switching operations are arranged in the basic as well as in the auxiliary transmissions.

From the Table according to FIG. 2 it is easily understandable which couplings A to F and solenoid valves $1a$, $1b$ are closed in the individual speeds and are engaged and disengaged by the electrohydraulic control, and in the case of the solenoid valves by the electronic control device, and actuated with system pressure with reference to the couplings.

In FIG. 3, an electrohydraulic control of a four-speed automatic transmission is shown in a simplified manner and as an excerpt of the total system, with the solenoid valves 1a, 1b, 1-2-gear control valve 2, 2-3-gear control valve 3, clutch valve 4 for the clutch C and clutch valve 5 for the clutch C', as well as the dampers 6 and 7 with the mutual interlinking via control pressure and system pressure lines. The solenoid valves 1a, 1b receive the shifting orders via the electric line 11 from an electronic control device, not shown in the drawing. The pressure medium is supplied from a pressure reducing valve, which is not shown in the drawing, via the pressure line 12. From the solenoid valve 1a, control pressure line 13 leads to the spring space 28 of the 1-2-gear control valve 2, while the control pressure line 14 connects the solenoid valve 1b with the frontally arranged annular spaces 21, 31 of the gear control valves 2, 3. Via the lines 15, 16, the 1-2-gear control valve 2 is supplied with system pressure in the annular spaces 24, 25, depending on the position of the selection slide valve (the selection slide valve is not represented in the drawing). From the third annular space 23, a line 230 leads to the not shown reverse-gear clutch D. The 1-2-gear control valve 2 is kept in the illustrated position by the spring 29 and the second annular space 22 and the seventh annular space 27 are vented. The 2-3-gear control valve 3 is supplied with system pressure via the line 46 in the fourth annular space 34 and via the line 261 in the fifth annular space 35. The third annular space 33 is connected via the lines 330, 332 and an orifice 8 with the second annular space 52 of the coupling valve 5, and the sixth annular space 36 is connected with the clutch B via the line 36 and the ball valve 10. The second and seventh annular spaces are vented. The clutch valve 4 is directly connected in the known manner with the damper 7 and acts depending on the engine torque and the position of the gas pedal. During shifting, the damper 7 with the coupling valve 4 is subjected to modulation pressure, so that the coupling valve works as a variable pressure-reducing valve, it controls the clutch pressure during shifting (FIGS. 4 and 5). The damper 6 of the coupling C' is connected via the line 531 with the line 530, which leads from the third annular space 53 of the clutch valve 5 to the clutch C'. A modulation pressure line 17 also leads into the damper space 61, this line leading at the same time to the first annular space 51 of the coupling valve 5 and to the annular space 41, located between the clutch valve 4 and the damper 7.

The electrohydraulic control works as follows: For the second speed, both solenoid valves 1a, 1b are engaged. Via the solenoid valve 1a, the pressure line 12 supplies control pressure to the spring space 28 of the 1-2-gear control valve 2, and via the solenoid valve 1b, also the first frontal annular spaces 21, 31 of the gear control valves 2 and 3 are acted upon. The 1-2-gear control valve 2 is blocked in the illustrated position due to the fact that the spring space 28 is filled, so that system pressure reaches the pressure control valve 4 via lines 16, 260, 262 and is directed depending on the load to the clutch C via line 45. When both clutches C and C' are synchronously engaged, via the line 46 load-dependent system pressure also reaches the fourth annular space 34 of the 2-3-gear control valve 3.

As a result of the control pressure supplied through line 14, this valve is the illustrated position, so that over the third annular space 33 and lines 330, 331 the fourth annular space 54 of the clutch valve 5 is filled. Valve 5 is actuated by the modulation pressure —line 17 —, so that via the third annular space 53 and the line 530 the clutch C' is acted upon. The shock absorber 6 has thereby no function. This synchronous shifting of both couplings C and C' according to FIG. 4 takes place in the upper load range with a relatively high rotational speed difference.

At zero load or in the lower load range, the coupling valve 5 is not engaged, so that the load-dependent system pressure from the 2-3-gear control valve 3 reaches the second annular space 52 via the lines 330, 332 and the shutter 8, and from the third annular spaces 53 it reaches the coupling C' via line 530. Under the effect of the aperture 8 in the line 332, the shock absorber 6 in the line 530 also becomes effective. The pressure increase in the coupling C' is delayed, thereby causing a staggering of the pressure increase in the two clutches C and C' (see FIG. 5) and a reduction of the transmitting capacity during shifting. The setting, respectively adjustment of the pressure increase of both clutches C, C' from the synchronous engagement —FIG. 4 — to the asynchronous engagement —FIG. 5 — takes place due to the design of the spring 56 in the coupling valve 5.

In order to avoid overlapping with the clutch B of the next speed during reverse shifting, the pressure of this clutch B, line 360, is directed over the line 361 into the spring space 55 of the coupling valve 5. Thereby, the clutch valve 5 is blocked in the position shown in the drawing, the shutter 8 and the shock absorber 6 are thus fully effective. In order to dampen the coupling valve 5, in the line 361 a restrictor 9 is provided.

I claim:

1. An automatically shiftable transmission including a basic transmission comprising a gearing mechanism operated by a first clutch and by a second clutch, said first and second clutches being controlled by a fluid-operated control system, said system comprising:

electrohydraulic control means for supplying a control pressure in response to a shifting order;
  a first gear-selection control valve receiving a pressure system and controlling the first clutch;
  a first coupling valve hydraulically connected with said first control valve, said first coupling valve being formed with a space receiving a modulation pressure;
  a first damping means cooperating with said first coupling valve for a gradual engagement of said first clutch;
  a second gear-selection control valve hydraulically interlinked with said first control valve and with said first coupling valve for receiving said system pressure, said second control valve receiving said control pressure from said control means;
  a second coupling valve hydraulically interlinked with said second gear-selection control valve for receiving said pressure system, said second coupling valve being formed with a front space receiving said modulation pressure and with a bottom space isolated from said front space, said second coupling valve having a first shifting position of said second coupling valve corresponding to synchronous operation of said clutches at a relatively high transmission load and a second shifting position of said second coupling valve corresponding to asynchronuous operation of said clutches at a relatively low transmission load of said transmission; and
  a damper provided with a bottom chamber and a top chamber biased by spring means for regulating the engagement of the second clutch, said bottom chamber receiving said system pressure, said top chamber being interlinked with said front space of said second coupling valve and receiving said modulation pressure, said damper being blocked by said modulation pressure in said first shifting position of said second coupling valve at said second high transmission load defining the synchronous engagement of said first and second clutches, said damper being received at said low transmission load of said modulation pressure in said second shifting position of said second coupling valve registered by means for registering provided in said bottom space of said second coupling valve and defining the asynchronous engagement of said first and second couplings.

2. An automatically shiftable transmission including a gear mechanism having first clutch and a second clutch, and a fluid-operated control system, said system comprising:

electrohydraulic control means including at least two solenoid valves for supplying a control pressure to control pressure lines in response to a shifting order;

a first gear-selection control valve controlling the engagement of the first clutch, said first gear-selection control valve being hydraulically connected with said control means and formed with a first annular space receiving a system pressure;

a first coupling valve formed with:
    a front space receiving a modulation pressure,
    a first annular space receiving said system pressure from said first annular space and connected with said first clutch, said first coupling valve being provided with a first damper cooperating with said front space of said first coupling valve and connected with said first clutch;

a second gear-selection control valve for controlling the second clutch and receiving said control pressure from said control means, said second gear-selection control valve being formed with a first annular space connected with said first annular space of said first gear-selection control valve and receiving said system pressure therefrom;

a second coupling valve provided with a spring and formed with:
    a front space spaced from said spring and receiving said modulation pressure so that said modulation pressure defining a first shifting position of said second coupling valve corresponding to synchronous operation of said clutches at a relatively high transmission load and a second shifting position of said second coupling valve corresponding to asynchronous operation of said clutches at a relatively low transmission load, and a first annular space hydraulicallly connected with said first annular space of said second gear-selection control valve through an orifice for directing a system pressure medium at said low load corresponding to said second shifting position, said first annular space being connected with said second clutch, and a second annular space receiving said pressure medium flowing unrestrictedly into said second space; and a second damper provided with:
    a compartment receiving said system pressure and connected with a first annular space of said second coupling valve and with said second clutch, and
    a chamber receiving said modulation pressure and defining with said compartment an absorbing space therebetween, said second damper being blocked in said first shifting position of said second coupling valve at said high transmission load, said second damper being relieved in said second shifting position of said second coupling valve retained in said second shifting position by said spring at said low transmission load and thereby ensuring an asynchronous engagement of said first and second couplings at said low transmission load.

3. The transmission defined in claim 2, wherein each of said control valve is formed with:
  a spring space, and
  a front space hydraulically connected with said control means, said spring space of said first gear control valve being hydraulically connected with said control means.

4. The transmission defined in claim 2, wherein said first coupling valve is formed with a bottom space hydraulically connected with said first annular space of said first coupling valve.

5. The transmission defined in claim 2, wherein a spring is provided in said absorbing space.

6. The transmission defined in claim 2, wherein said control means are a first and a second solenoid valves.

* * * * *